(12) United States Patent
Horev et al.

(10) Patent No.: US 12,124,588 B2
(45) Date of Patent: Oct. 22, 2024

(54) SECURING A STORAGE SYSTEM

(71) Applicant: VAST DATA LTD., Tel Aviv (IL)

(72) Inventors: Alon Horev, Tel Aviv (IL); Ran Sheri, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 267 days.

(21) Appl. No.: 17/645,980

(22) Filed: Dec. 24, 2021

(65) Prior Publication Data

US 2023/0205889 A1 Jun. 29, 2023

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .................. G06F 21/577; G06F 2221/033
See application file for complete search history.

(56) References Cited

U.S. PATENT DOCUMENTS

| | | | | |
|---|---|---|---|---|
| 6,282,698 B1* | 8/2001 | Baker | ...................... | G06F 8/75 |
| | | | | 717/136 |
| 7,797,323 B1* | 9/2010 | Eshghi | ................ | G06F 16/1748 |
| | | | | 707/747 |
| 7,814,078 B1* | 10/2010 | Forman | ............. | G06F 16/24554 |
| | | | | 707/698 |
| 8,290,962 B1* | 10/2012 | Chu | ..................... | G06F 16/319 |
| | | | | 715/228 |
| 8,489,612 B2* | 7/2013 | Cherkasova | ............. | G06N 5/02 |
| | | | | 707/747 |
| 8,543,543 B2* | 9/2013 | Marcelais | ............ | G06F 16/137 |
| | | | | 717/168 |
| 8,676,725 B1* | 3/2014 | Lin | ....................... | G06N 20/00 |
| | | | | 706/14 |
| 9,153,239 B1* | 10/2015 | Postelnicu | .............. | G10L 25/18 |
| 9,720,925 B1* | 8/2017 | Lawson | ................ | G06F 40/194 |
| 10,162,967 B1* | 12/2018 | Oliver | ................... | H04L 63/145 |
| 11,475,128 B2* | 10/2022 | Coull | ..................... | G06F 21/554 |
| 11,487,876 B1* | 11/2022 | Pryde | ...................... | G06F 21/56 |
| 11,636,221 B2* | 4/2023 | Saad | ................... | H04L 63/0853 |
| | | | | 726/28 |
| 11,663,166 B2* | 5/2023 | Wong | .................... | G06F 16/119 |
| | | | | 707/692 |
| 11,880,391 B2* | 1/2024 | Paranjape | .......... | G06F 16/2255 |
| 2004/0220975 A1* | 11/2004 | Carpentier | ............. | G06F 21/64 |

(Continued)

FOREIGN PATENT DOCUMENTS

JP 2010256951 A 11/2010
JP 2013247389 A 12/2013

*Primary Examiner* — Vance M Little
(74) *Attorney, Agent, or Firm* — Reches Patents

(57) ABSTRACT

A method for securing a storage system, the method may include detecting, by cybersecurity engine, a suspected file that is stored in the storage system; autonomously searching for one of more files that fulfill one or more similarity criteria in relation to the suspected file; wherein the one or more similar files are stored in a storage system; finding, by the similarity engine, the one or more similar files using a similarity data structure that associates a group of files stored in the storage system with (a) inter-file similarity scores and (b) block hash values shared between files; and responding to the finding, wherein the responding comprises sending the one of more similar files to the cybersecurity engine.

21 Claims, 6 Drawing Sheets

(56) References Cited

U.S. PATENT DOCUMENTS

| | | | |
|---|---|---|---|
| 2005/0114658 A1* | 5/2005 | Dye | H04L 63/1408 707/999.009 |
| 2012/0233135 A1* | 9/2012 | Tofano | G06F 16/24556 707/E17.002 |
| 2013/0339316 A1 | 12/2013 | Hirsch et al. | |
| 2014/0007239 A1* | 1/2014 | Sharpe | G06F 16/183 726/24 |
| 2014/0114933 A1* | 4/2014 | Chandrasekarasastry | G06F 3/06 711/165 |
| 2015/0026135 A1 | 1/2015 | Aronovich | |
| 2015/0082399 A1* | 3/2015 | Wu | H04L 63/0838 726/10 |
| 2016/0294849 A1* | 10/2016 | Adams | G06F 21/577 |
| 2017/0228392 A1* | 8/2017 | Schneider | G06F 16/174 |
| 2018/0129861 A1 | 5/2018 | Kim et al. | |
| 2018/0260405 A1* | 9/2018 | Shantharam | G06F 12/023 |
| 2019/0108238 A1* | 4/2019 | Somers | G06F 16/1748 |
| 2019/0361843 A1* | 11/2019 | Stoddard | G06F 16/1834 |
| 2020/0192865 A1* | 6/2020 | Eads | G06F 16/2471 |
| 2020/0341963 A1* | 10/2020 | Kreutzer | G06F 16/2358 |
| 2021/0117544 A1* | 4/2021 | Kurtz | G06F 21/577 |
| 2021/0342634 A1 | 11/2021 | Chen et al. | |
| 2021/0357396 A1* | 11/2021 | Sandler | G06F 16/245 |
| 2021/0374121 A1 | 12/2021 | Paul et al. | |
| 2022/0019665 A1* | 1/2022 | Perry | G06F 21/10 |
| 2022/0083509 A1* | 3/2022 | Dhanabalan | H04L 67/01 |
| 2022/0129417 A1* | 4/2022 | Diaz | G06F 21/562 |
| 2022/0188198 A1* | 6/2022 | Nagarajegowda | G06F 40/40 |
| 2022/0197755 A1* | 6/2022 | Thakkar | G06F 16/174 |
| 2023/0087234 A1* | 3/2023 | Muzzo | G06F 21/85 726/22 |
| 2023/0119183 A1* | 4/2023 | Wong | G06F 16/137 707/822 |
| 2024/0022648 A1* | 1/2024 | Ponnala | G06F 16/1748 |

* cited by examiner

SECURING A STORAGE SYSTEM

TECHNICAL FIELD

The present disclosure generally relates to the field of data storage, and more particularly to securing a storage system.

BACKGROUND

Identifying similar or identical blocks in a storage system is commonly used for avoiding storing duplicate data blocks, such as in deduplication techniques. Data is usually chunked, and the comparison is based on relatively small chunks, because checking large chunks may miss smaller identical contents.

Identifying identical or similar files is complicated and time consuming, particularly when the files are very large, being updated frequently, have wide variant sizes, and when there are a vast number of files stored in the storage system or in one filesystem.

There is a growing need to provide an efficient manner of finding similarities between files that are stored in a storage system and may endanger the storage system.

SUMMARY

There may be provide a storage system, a method and a non-transitory computer readable medium for securing a storage system.

The storage system may store a vast number (for example more than 1 million files, 10 million files, 50 million files, 500 million filers and more).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
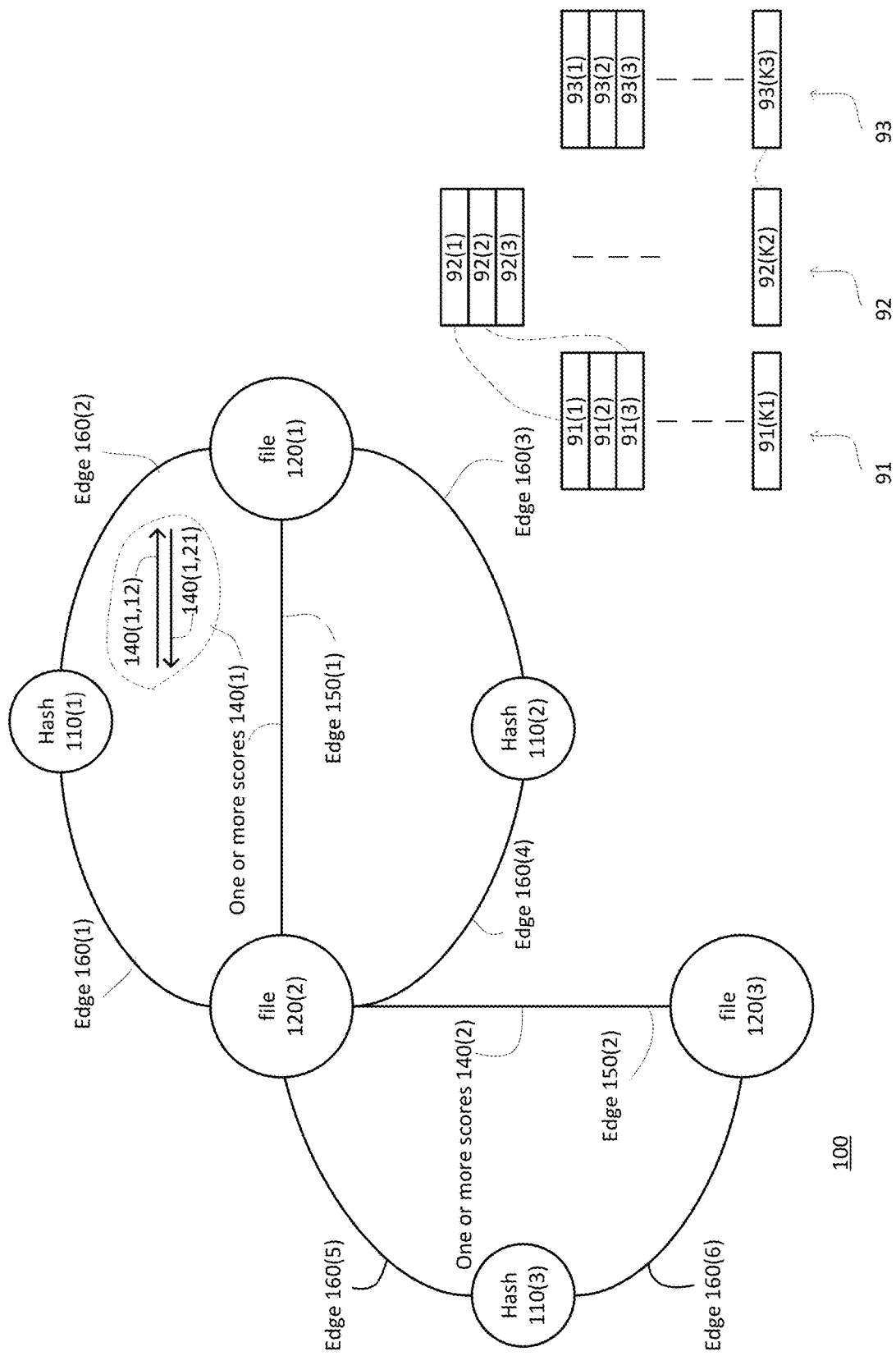
FIG. 1 is an example of a part of a similarity data structure.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a method and a non-transitory computer readable medium for similarity searches.

The storage system may apply hash functions to determine similarity. Hashing is usually employed for detecting duplicate data blocks, by applying a hash formula on the content of the data blocks. When a duplicate data block is detected, by comparing the block hash to an existing hash of an identical block already stored in the storage system (reference data block), the storing of the duplicate data block can be eliminated, and only a pointer to the reference data block needs to be stored.

Hash functions can provide strong hashing, such as various SHA algorithms, where a small change in data produces a very different hash string.

Similarity hashing, such as Locality Sensitive Hashing (LSH), preserves item similarity, such that when applying the hash function on similar items, they will produce the same hash value with high probability. Similarity hashing can help identifying data blocks having slight changes. Known hash functions include Minhash, SimHash, and idhash.

The level of similarity between two data blocks, also referred to as similarity distance, can be determined by Jaccard similarity coefficient, which is a statistic used for gauging the similarity and diversity of sample sets. is a metric to compare the similarity of any two sets. Levenshtein distance is a string metric that can be used to measure the difference between two sequences, and it can define the number of bits that are different between two data blocks.

The storage system may employ block level hashing mechanism that detects identical or similar blocks, for detecting files that are similar to a given file, or a portion of a file. In response to obtaining a reference file (e.g., a file or a file identification received from a user of the storage system, or a file detected as suspicious by the storage system), the storage system provides a list of files identified as the most similar files, by using block hashing, or using a block level deduplication mechanism of the storage system.

The similarity check may be useful for purposes other than deduplication—for example for identify a certain repeating inciteful or conspirative messages, identify viruses, identify malicious worms, identify a potential security breach where a classified data such as an encryption key or password is spread, or just identifying files that are similar to a file of interest.

A mechanism for identifying files that are similar to a reference file or a reference dataset (e.g., a file portion, one or more blocks) may provide a score for the similarity between any two files in the system or a portion of the system (e.g., a specific filesystem, filesystems related to a specific user), or between the reference file and any other file in the system or in the portion of the filesystem.

According to an embodiment of the invention, a similarity database is built for calculating a similarity score per each pair of files.

The similarity database may be based on a graph database such as Neo4J.

FIG. 1 illustrates an example of a part of a similarity database 100 that is based on a graph, and includes the following entities: (i) a node for each file, such as file nodes 120(1)-120(3); (ii) a node for each hash, such as hash nodes 110(1)-110(3); (iii) edges between file nodes and hashes nodes—for hashes associated with blocks of each file, such as edges 160(1)-160(6), where edge 160(1) indicates that hash 110(1) was calculated for at least one block of file 120(2), edge 160(4) indicates that hash 110(2) was calculated for at least one block of file 120(2), etc.; (iv) edges between similar files (that share one or more hashes), such as edge 150(1) that indicates that there is a certain similarity between file 120(1) and 120(2), and edge 150(2) that indicates that there is a certain similarity between file 120(2) and 120(3). The similar files edges 150 may include a property of edges 150 that indicates one or more similarity scores between the two files, such as score 140(1) and 140(2).

A score between two files (which is an example of inter-file similarity scores) may indicate the number of shared hashes between the two files.

For example, inter-file similarity score 140(1) may have the value '2', to indicate that files 120(1) and 120(2) share 2 hashes (110(1) and 110(2)). Inter-file similarity score 140(2) may be equal to '1' to indicate that files 120(2) and 120(3) share 1 hash (110(3)).

A higher number of shared hashes may indicate a higher similarity score. For example, suppose it is requested to find a file that is most similar to file 120(2). It can be determined that both files 120(1) and 120(3) share a certain level of similarity with file 120(1), since both of them have an edge connecting them with file 120(1), that indicates that the files share at least one hash. However, file 120(1) may be considered as more similar to file 120(2), since it has the highest score among the two similar files.

The inter-file similarity score may be further based on the size of the file. For example, if a first file is included in a second file in its entirety, then a first to second file similarity score (how many blocks of the first file are similar to blocks of the second file) is the highest inter-file similarity score, for example, can be considered as a 100% match, when looking for files that are similar to the first file. On the other hand, if the second file is substantially larger than the first file, e.g., 100 times larger, than the second to first inter-file similarity score may be low, for example, equal to 1%, to indicate that only 1% of the second file is shared with the first file.

Therefore, the inter-file similarity score may not be symmetric, such as in a case where the score further depends on a characteristic of each file, such as the size of the file, or the portion of the shared content out of the entire file.

FIG. 1 illustrates an example of a first to second file similarity score 140(1,12) and an example of a second to first file similarity score 140(1,21).

The portion of the shared content may be based on the number of share hashes, and the size of the blocks being hashed. For example, if the size of the blocks is 32 KB, and there are two shared hashes between the first and second files, then the shared portion is 64 KB. If the size of the first file is 64 KB, then 100% of the first file may be shared with the second file.

In this case, each edge, or every pair of files, is associated with two inter-file similarity score scores, one for each direction. The direction is determined by the file for which similarity is to be checked. If a similarity check is conducted for the first file of the example above, then a first-to-second similarity score is considered, i.e., the weight of the shared portion when taking into account the size of the first file. If a similarity check is conducted for the second file, then a second to first similarity score is considered, i.e., the weight of the shared portion when taking into account the size of the second file.

It is noted, that the size of the hashed block may be a fixed size, where the file is split to blocks according to offsets in the file, or a variable size, where the file is split into variable sized blocks according to a content, by using a rolling hash (e.g., the Rabin hash) to find break points.

Files may be further be considered as similar based on shared similarity hashes. The similarity score between two files that share similarity hashes may further be based on the similarity distance defined by the similarity hashes.

FIG. 1 also illustrates first file 91, second file 92 and third file 93—represented by fine nodes 120(1), 120(2) and 120(3) respectively. First file 91 has K1 blocks 91(1)-91(K1). Second file 92 has K2 blocks 92(1)-92(K2). Third file 93 has K3 blocks 93(1)-93(K3). K1, K2 and K3 are positive integers and may be equal to each other or differ from each other.

Block 91(1) and block 92(1) have the same hash value—hash value 110(1).

Block 91(3) and block 92(2) have the same hash value—hash value 110(2).

Block 92(K2) and block 93($k3$) have the same hash value—hash value 110(3).

The storage system may receive a request for information about similar files. The request may include an identification of a file to be checked for similar files, such as a file pathname or a file handle. The request may include a range within the file (e.g., start offset within the file and an end offset or a size of the range), in a case where only a portion of the file is to be checked. The request may further identify the portion of the system to be checked: one or more filesystems stored in the storage system, filesystems associated with a specific user, all the filesystems, etc. The request may further restrict the similarity check to files with certain characteristics, such as files that were modified or created since the last request for information about similar files.

In response to the received request for similar files information, the similarity database will be accessed for retrieving neighbors of the requested file, i.e., files that are connected to the requested file via edges. The response may include only part of the similar files, i.e., only the most similar files, or only files having a shared similarity that is above a certain score. The response may filter out files according to characteristics of files indicated in the request, e.g., according to modification and creation time of the file, the filesystem to which the files belong, etc.

The storage system may create the similarity database in response to a request to create the similarity database. The request may limit the scope of files covered by the similarity database to specific file and filesystem characteristics. The request may provide a preferred block size, or the block size may be determined by the system. The block size may be for example, 4 KB, 16 KB, 32 KB, 64 KB, etc. A larger block size will consume less space, since less hashes need to be stored, where a smaller block size allows detecting similarities in smaller portions and in small files. The block size may be determined based on the file sizes in the system, for example, a block size that is not larger than 99% of the files.

The creation of entries in the database (e.g., nodes and edges) may be only in response to new file modification and creation, or may be performed as a background process that crawl the files for which similarity needs to be mapped.

For each file for which similarity needs to be mapped, a hash function (similarity or strong hash function) is applied on the blocks of the file, to obtain multiple hashes of the file. If the file is a new file, the file is added as a node to the similarity database. For each of the calculated hashes—an edge is added between the file and the hash node, and if the hash does not yet exist in the similarity database, the hash is added as a node. For each of the hashes that already exists in the similarity database (i.e., referred to by other files)—add an edge to the files that point to this hash and assign an initial score for the edge. If an edge towards another file already exists—update a new score to reflect the addition of the new block.

According to an embodiment of the invention, when an anti-malware application detects a suspicious file, similar files are searched, and if found—the suspected files are fed to the antimalware application.

The storage system may determine a suspicious threshold of the score, and files having scores above the suspicious threshold may be defined as suspicious files and fed to the antimalware application.

Figure 2:
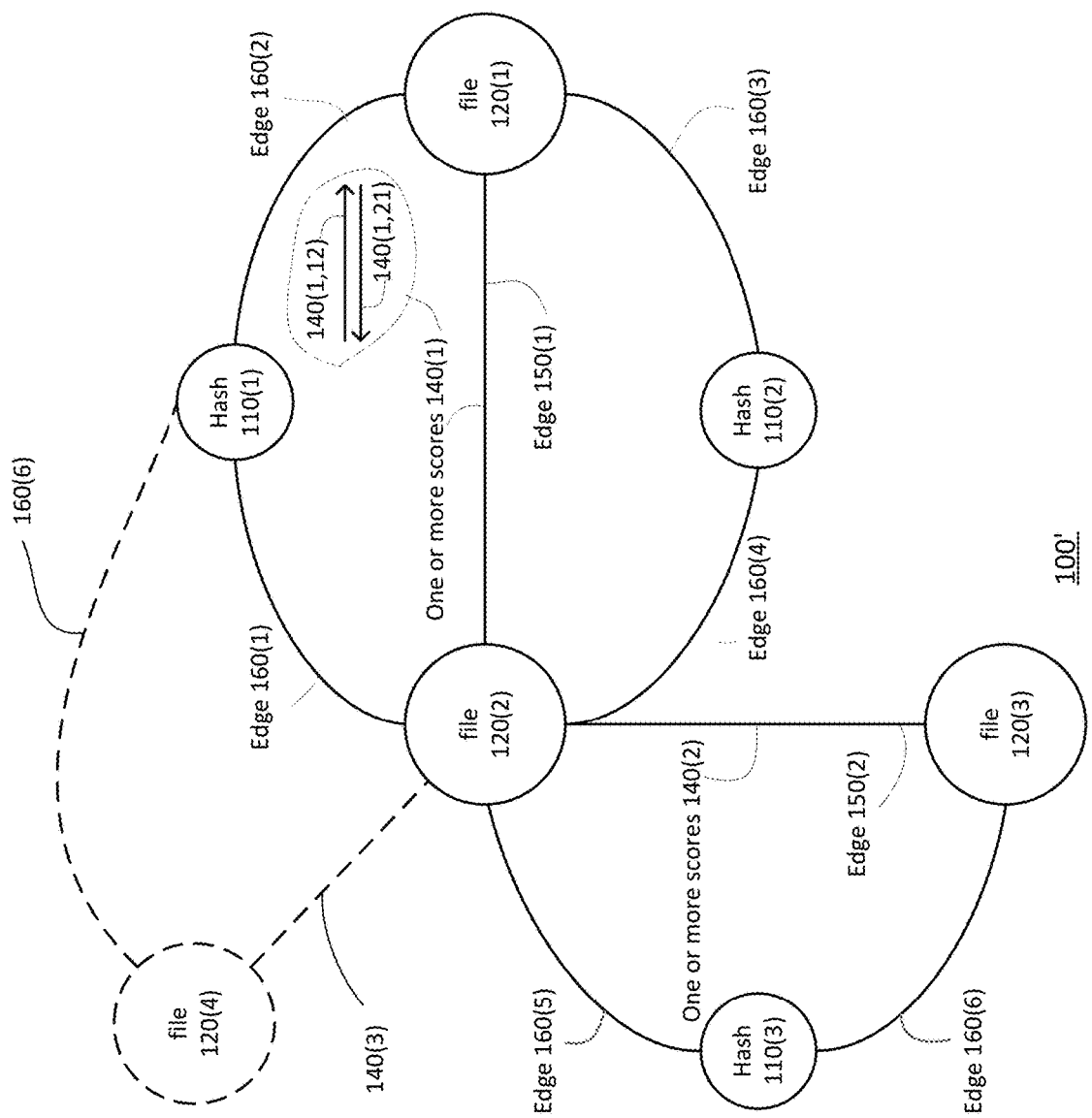
FIG. 2 is an example of a part of a similarity data structure.

FIG. 2 illustrates an example of a part of a similarity database 100' that is based on a graph, and includes, in addition to the entities of the part of similarity database 100 of FIG. 1—the following: file node 120(4) that represents a new file added to the system, an additional edge 160(6) between file node 120(4) and the hash node 110(1), and one or more inter-node score 140(3).

In the example of FIG. 2 the files represented by file nodes 120(2) and 120(4) share hash value 110(1)—that already existed in the part of similarity database 100 of FIG. 1—so that the addition of file node 120(4) is not followed by adding a new hash value.

Figure 3:
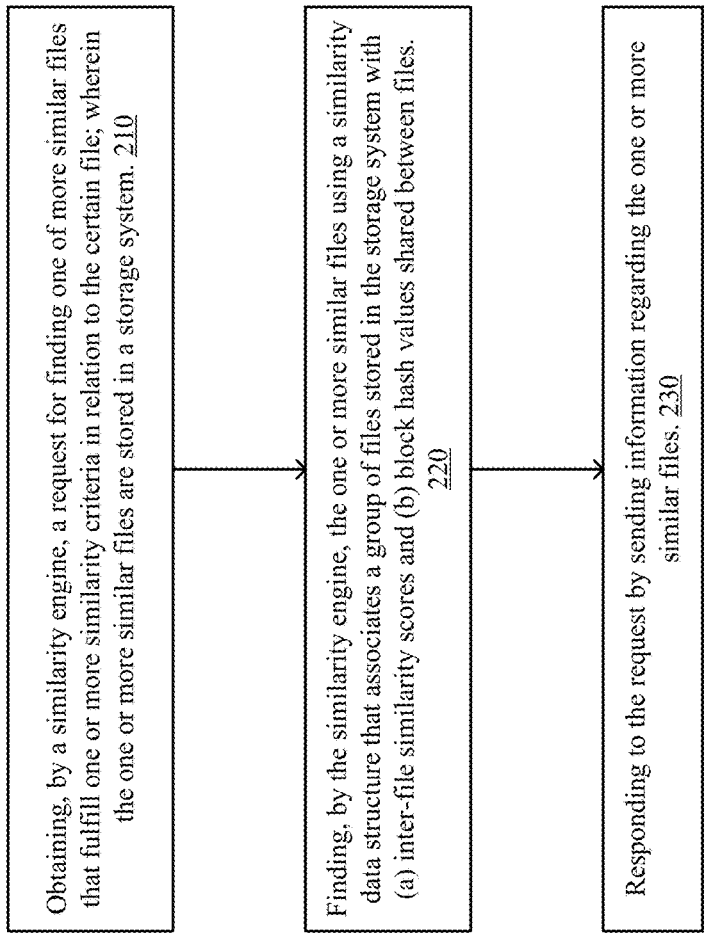
FIG. 3 is an example of a method.

FIG. 3 illustrates method 200 for similarity detection of files stored in a storage system.

Method 200 may start by step 210 of obtaining, by a similarity engine, a request for finding one of more similar files that fulfill one or more similarity criteria in relation to the certain file; wherein the one or more similar files are stored in a storage system. Any similarity criteria may be defined. For example—the similarity criteria may define the amount of similarity required—for example may define a minimal similarity score between files. The request may also define how to respond—for example—whether to send a response related to all files that are similar enough (according to the similarity criteria), whether to limit the number of files in the response—whether to send only the most X similar files, and the like. A similarity criteria may also indicate how to calculate the similarity score—for example which similarity test or process to be applied—for example which (one or more) hash functions to apply, how to calculate the similarity score, and the like.

Figure 6:
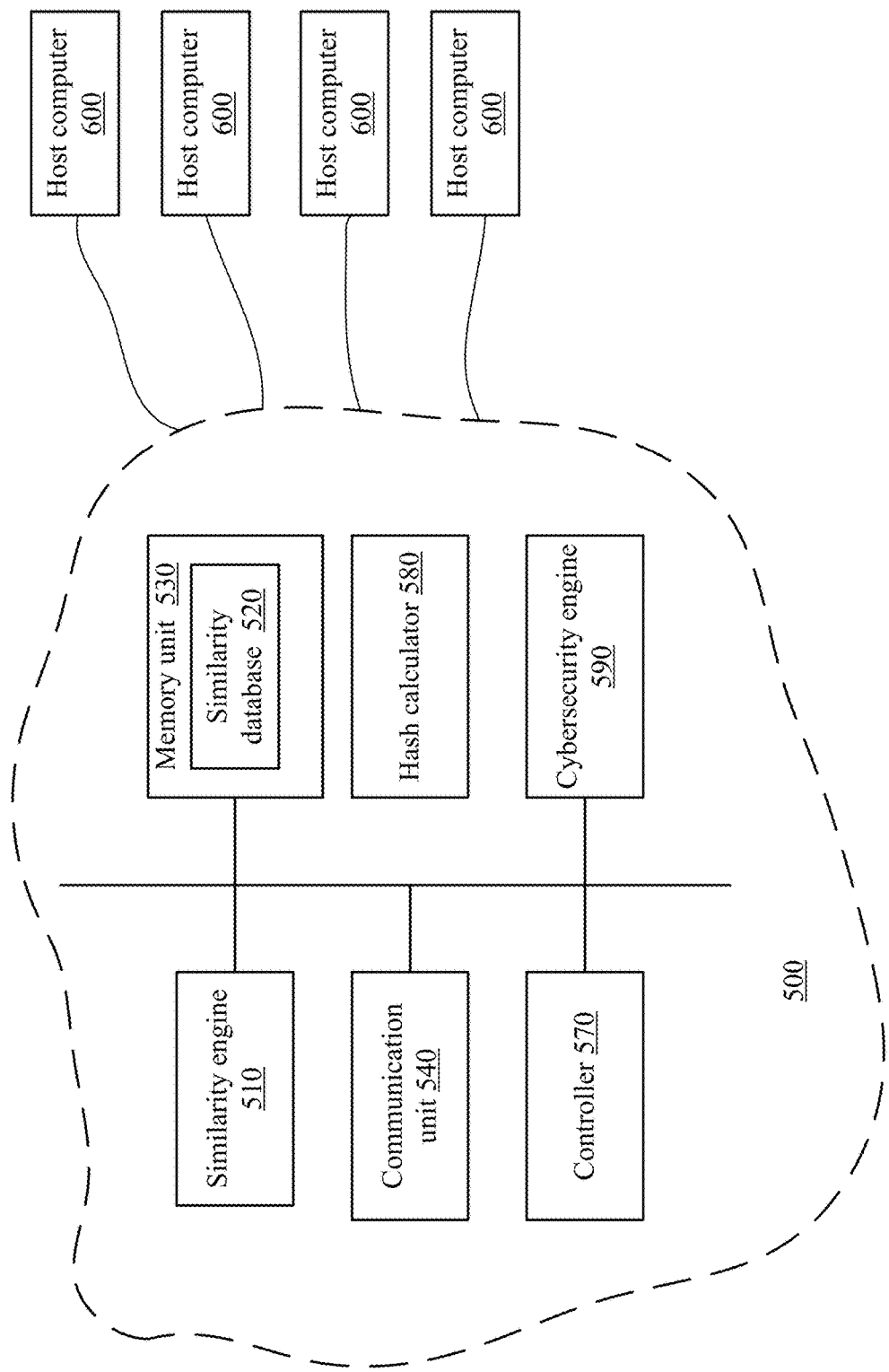
FIG. 6 is an example of a storage system.

The request may be generated and/or sent by an entity (for example a host computer) outside the storage system and/or may be generated and/or sent by an entity (for example a de-duplication processor, a cybersecurity engine) within the storage system. The request may be received by a communication unit (denoted 540 in FIG. 6).

Step 210 may be followed by step 220 of finding, by the similarity engine, the one or more similar files using a similarity data structure that associates a group of files stored in the storage system with (a) inter-file similarity scores and (b) block hash values shared between files.

The group of files may be all the files stored in the storage system, only some of the files stored in the storage system and/or files that share one or more attribute. An example of an attribute is a user that is associated with the file, a group of users that have access to the group of files, and the like.

Step 220 may be followed by step 230 of responding to the request. The request may include sending information regarding the one or more similar files.

The information may include similar file identifiers, shared hash values, inter-file similarity scores of the one or more similar files.

The one or more similar files may be limited by one or more similarity criterion and/or may be limited to up to a maximal number of similar files.

The responding may include outputting a list of one or more similar files, replacing one of the similar files by delta information indicative of differences with the replaced file and one of the similar files, alerting a cybersecurity engine, requesting the cybersecurity engine to check the similar files, and the like.

The similarity data structure stores a relatively small amount of information and therefore may be compact. The similarity data structure also stores various items required for finding a shared hash value between files, finding the similarity score and also includes information about the files that share the hash values. Using the similarity data structure simplifies and speeds up the finding of files that may endanger the storage system. It assist to provide a fast and accurate response to security issues.

The similarity data structure may include nodes that represent the files of the group of files, wherein files of a sub-group of the group are (a) linked to each other, (b) linked to one or more block hash value that are shared by the files of the sub-group; and (c) are associated with inter-file similarity scores. See, for example, FIGS. 1 and 2, where files 91, 92, and 93, represented by nodes 120(1), 120(2) and 120(3), form the group of files. Nodes 120(1) and 120(2) represent a sub group of similar files 91 and 92, and nodes 120(2) and 120(3) represent another sub group of similar files 92 and 93.

An inter-file similarity score may refer to a level of similarity between one file to another.

The sub-group may include a first file and a second file. The inter-similarity scores may include a first to second file similarity score and a second to first file similarity score.

The first to second file similarity score may be indicative of a number of blocks of the first file that have similar blocks within the second file.

The second to first file similarity score may be indicative of a number of blocks of the second file that have similar blocks within the first file.

The first to second file similarity score may be indicative of a ratio between (a) number of blocks of the first file that have similar blocks within the second file, and (b) a number of blocks of the first file.

The first to second file similarity score is indicative of an aggregate size of blocks of the first file that have similar blocks within the second file. Each hash node may include, in addition to the hash value, the size of the hashed block, and the aggregate size of blocks may be calculated by summing the block sizes indicated by the shared block hash values.

The first to second file similarity score may be indicative of a ratio between (a) an aggregate size of blocks of the first file that have similar blocks within the second file, and (b) an aggregate size of blocks of the first file.

The inter-file similarity scores of different files of the group may be based on block hash values that are shared between the different files. In this case—the inter-file similarity scores of different files of the group may also be based on a size relationship between the different files.

The single hash function may be applied by the storage system when creating the similarity data structure and/or when utilizing the similarity data structure.

It should be noted that different hash functions may be applied by the storage system. The hash function may change over time. The storage system may apply hash functions in parallel to each other, and the like.

The storage system may select a hash function based on the status of the storage system—for example reduce the strength of the hashing (for example move from a strong hash function to a weaker hash function) when a storage space reduction is required.

Figure 4:
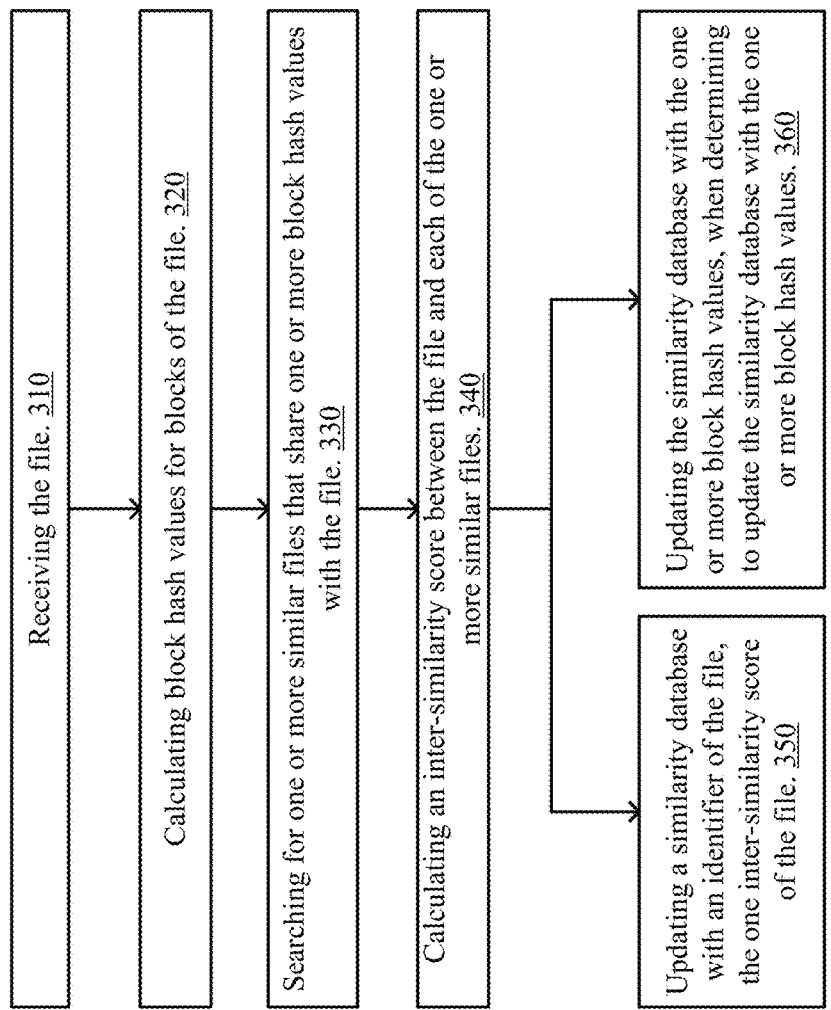
FIG. 4 is an example of a method.

FIG. 4 illustrates an example of a method 300 of similarity determination of a file sent to a storage system.

Method 300 may start by step 310 of receiving the file.

The file may be received from a computerized system (for example a host computer) outside the storage system.

Step 310 may be followed by step 320 of calculating block hash values for blocks of the file.

Step 320 may be followed by step 330 of searching for one or more similar files that share one or more block hash values with the file.

Step 330 may be followed by step 340 of calculating an inter-similarity score between the file and each of the one or more similar files.

Step 340 may be followed by step 350 of updating a similarity database with an identifier of the file, the one inter-similarity score of the file. See for example the addition of the node 120(4), in FIG. 2.

Step 340 may also be followed by step 360 of updating the similarity database with the one or more block hash values, when determining to update the similarity database with the one or more block hash values. If—for example—the block hash values already exists in the similarity database then there may no need to add the block hash value. In this case, only the inter-similarity scores related to the existing block hash values may be updated.

Method 300 may include step 305 of selecting one or more block hash function for calculating the block hash values.

The selecting may be based on a size of the similarity database.

The selecting may be based on a number of different values of block hash values of the similarity database.

The similarity data structure may include nodes that represent files of a group of files, wherein files of a sub-group of the group are (a) linked to each other, (b) linked to one or more block hash value that are shared by the files of the sub-group; and (c) are associated with interfile similarity scores.

Figure 5:
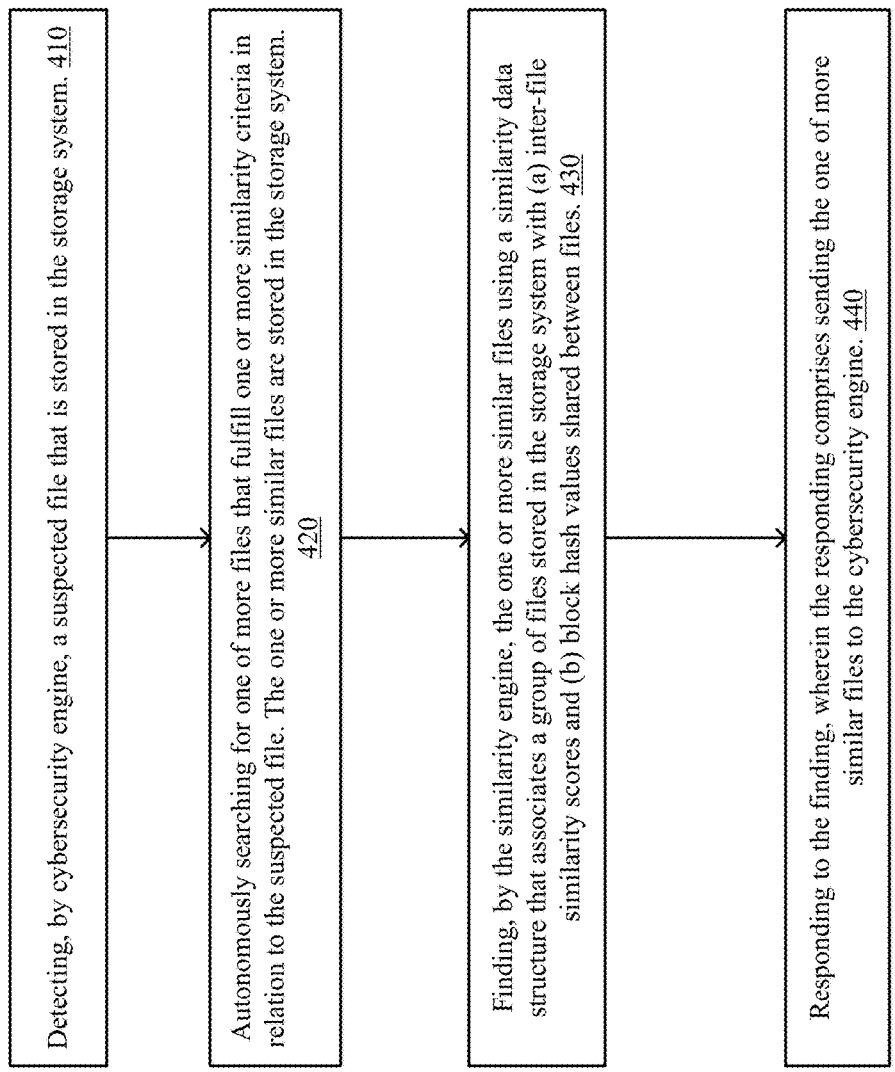
FIG. 5 is an example of a method.

FIG. 5 illustrates method 400 for securing a storage system.

Method 400 may start by step 410 of detecting, by cybersecurity engine, a suspected file that is stored in the storage system.

The cybersecurity engine may apply any security process—machine learning based, ono-machine learning based, anti-malware, virus detection, and the like.

Step 410 may be followed by step 420 of autonomously searching for one of more files that fulfill one or more similarity criteria in relation to the suspected file. The one or more similar files are stored in the storage system.

Autonomously may refer to executing step 420 without human intervention and/or without waiting to an additional authorization to do so, and the like. This map speed the response to security breaches and make the protection more robust and reliable.

Step 420 may be followed by step 430 of finding, by the similarity engine, the one or more similar files using a similarity data structure that associates a group of files stored in the storage system with (a) inter-file similarity scores and (b) block hash values shared between files.

Step 430 may be followed by step 440 of responding to the finding, wherein the responding comprises sending the one of more similar files to the cybersecurity engine. Step 440 may be followed by step 410.

The similarity data structure comprises nodes that represent the files of the group of files, wherein files of a sub-group of the group are (a) linked to each other, (b) linked to one or more block hash value that are shared by the files of the sub-group; and (c) are associated with interfile similarity scores.

The similarity data structure stores a relatively small amount of information and therefore may be compact.

The similarity data structure may include nodes that represent the files of the group of files, wherein files of a sub-group of the group are (a) linked to each other, (b) linked to one or more block hash value that are shared by the files of the sub-group; and (c) are associated with inter-file similarity scores. See, for example, FIGS. 1 and 2.

An inter-file similarity score may refer to a level of similarity between one file to another.

The sub-group may include a first file and a second file. The inter-similarity scores may include a first to second file similarity score and a second to first file similarity score.

The first to second file similarity score may be indicative of a number of blocks of the first file that have similar blocks within the second file.

The second to first file similarity score may be indicative of a number of blocks of the second file that have similar blocks within the first file.

The first to second file similarity score may be indicative of a ratio between (a) number of blocks of the first file that have similar blocks within the second file, and (b) a number of blocks of the first file.

The first to second file similarity score is indicative of an aggregate size of blocks of the first file that have similar blocks within the second file.

The first to second file similarity score may be indicative of a ratio between (a) an aggregate size of blocks of the first file that have similar blocks within the second file, and (b) an aggregate size of blocks of the first file.

The inter-file similarity scores of different files of the group may be based on block hash values that are shared between the different files. In this case—the inter-file similarity scores of different files of the group may also be based on a size relationship between the different files.

The single hash function may be applied by the storage system when creating the similarity data structure and/or when utilizing the similarity data structure.

It should be noted that different hash function may be applied by the storage system. The hash function may change over time. The storage system may apply hash functions in parallel to each other, and the like.

The storage system may select a hash function based on the status of the storage system—for example reduce the strength of the hashing (for example move from a strong hash function to a weaker has function) when a storage space reduction is required.

FIG. 5 illustrates storage system 500 and its environment—the environment is represented by host computers 600 that are coupled to the storage system 500. The storage system 500 include a similarity engine 510 for calculating inter-files similarity scores and/or for finding similar files, a communication unit 540 for communicating between the entities of the storage system and/or communicating with the environment of the storage system, a memory unit 530 for storing the similarity database 520, a hash calculator 580 for calculating hash values, cybersecurity engine 590 for securing the storage system (or a part of the storage system) and controller 570 for controlling the operation of the storage system—for example selecting which hash function to user.

Each one of the similarity engine 510, communication unit 540, memory unit 530, hash calculator 580, cybersecurity engine 590 and controller 570 may be implemented by one or more processing circuitry and/or executed by or hosted by one or more processing circuitry.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

The invention claimed is:

1. A method for securing a storage system, the method comprises:
    detecting, by cybersecurity engine, a suspected file that is stored in the storage system;
    autonomously searching for one or more files that fulfill one or more similarity criteria in relation to the suspected file; wherein the one or more similar files are stored in a storage system;
    finding, by the similarity engine, the one or more similar files using a similarity data structure that associates a group of files stored in the storage system and comprises nodes representing files of the group of files; wherein nodes representing files of a sub-group of the group are (a) linked to each other, wherein links connecting pairs of the nodes, are associated with inter-file similarity scores indicating a similarity between files represented by the pairs of nodes (b) linked to one or more block hash values that are shared by the files of the sub-group; wherein an inter-file similarity score associated with a link connecting nodes representing two files, is based at least on a number of block hash values that are linked to the nodes representing the two files; and
    responding to the finding, wherein the responding comprises sending information about the one or more similar files to the cybersecurity engine.

2. The method according to claim 1 wherein the sub-group comprise a first file and a second file; wherein the inter-file similarity scores comprises a first to second file similarity score and a second to first file similarity score.

3. The method according to claim 2 wherein the first to second file similarity score is indicative of a number of blocks of the first file that have similar blocks within the second file.

4. The method according to claim 2 wherein the first to second file similarity score is indicative of a ratio between (a) number of blocks of the first file that have similar blocks within the second file, and (b) a number of blocks of the first file.

5. The method according to claim 2 wherein the first to second file similarity score is indicative of an aggregate size of blocks of the first file that have similar blocks within the second file.

6. The method according to claim 2 wherein the first to second file similarity score is indicative of a ratio between (a) an aggregate size of blocks of the first file that have similar blocks within the second file, and (b) an aggregate size of blocks of the first file.

7. The method according to claim 1 wherein inter-file similarity scores of different files of the group are based on block hash values that are shared between the different files.

8. The method according to claim 7 wherein inter-file similarity scores of different files of the group are also based on a size relationship between the different files.

9. The method according to claim 1 wherein at least two files of the group are associated with block hash values calculated by at least two hash functions that differ from each other.

10. The method according to claim 1 wherein the block hash values are calculated by block hash functions that are selected based on a status of the storage system.

11. At least one non-transitory computer readable medium that stores instructions for: detecting, by cybersecurity engine, a suspected file that is stored in the storage system; autonomously searching for one or more files that fulfill one or more similarity criteria in relation to the suspected file; wherein the one or more similar files are stored in a storage system; finding, by the similarity engine, the one or more similar files using a similarity data structure that associates a group of files stored in the storage system and comprises nodes representing files of the group of files; wherein nodes representing files of a sub-group of the group are (a) linked to each other, wherein links connecting pairs of the nodes, are associated with inter-file similarity scores indicating a similarity between files represented by the pairs of nodes (b) linked to one or more block hash values that are shared by the files of the sub-group; wherein an inter-file similarity score associated with a link connecting nodes representing two files, is based at least on a number of block hash values that are linked to the nodes representing the two files; and responding to the finding, wherein the responding comprises sending information about the one or more similar files to the cybersecurity engine.

12. The at least one non-transitory computer readable medium according to claim 11, wherein the sub-group comprise a first file and a second file; wherein the inter-file similarity scores comprises a first to second file similarity score and a second to first file similarity score.

13. The at least one non-transitory computer readable medium according to claim 12 wherein the first to second file similarity score is indicative of a number of blocks of the first file that have similar blocks within the second file.

14. The at least one non-transitory computer readable medium according to claim 12 wherein the first to second file similarity score is indicative of a ratio between (a) number of blocks of the first file that have similar blocks within the second file, and (b) a number of blocks of the first file.

15. The at least one non-transitory computer readable medium according to claim 12 wherein the first to second file similarity score is indicative of an aggregate size of blocks of the first file that have similar blocks within the second file.

16. The at least one non-transitory computer readable medium according to claim 12 wherein the first to second file similarity score is indicative of a ratio between (a) an aggregate size of blocks of the first file that have similar blocks within the second file, and (b) an aggregate size of blocks of the first file.

17. The at least one non-transitory computer readable medium according to claim 11 wherein inter-file similarity scores of different files of the group are based on block hash values that are shared between the different files.

18. The at least one non-transitory computer readable medium according to claim 17 wherein inter-file similarity scores of different files of the group are also based on a size relationship between the different files.

19. The at least one non-transitory computer readable medium according to claim 11 wherein at least two files of the group are associated with block hash values calculated by at least two hash functions that differ from each other.

20. The at least one non-transitory computer readable medium according to claim 11 wherein the block hash values are calculated by block hash functions that are selected based on a status of the storage system.

21. A storage system having cyber protection capabilities, the storage system comprises:
- a cybersecurity engine that is configured to detect a suspected file that is stored in the storage system;
- a similarity engine that is configured to autonomously search for one of more files that fulfill one or more similarity criteria in relation to the suspected file; wherein the one or more similar files are stored in a storage system, wherein the searching is executed using a similarity data structure that associates a group of files stored in the storage system and comprises nodes representing files of the group of files; wherein nodes representing files of a sub-group of the group are (a) linked to each other, wherein links connecting pairs of the nodes, are associated with inter-file similarity scores indicating a similarity between files represented by the pairs of nodes (b) linked to one or more block hash values that are shared by the files of the sub-group; wherein an inter-file similarity score associated with a link connecting nodes representing two files, is based at least on a number of block hash values that are linked to the nodes representing the two files; between files; and wherein the storage system is configured to respond to the finding, wherein the response comprises sending information about the one or more similar files to the cybersecurity engine.

* * * * *